June 16, 1959   C. C. HENDRICKSON   2,890,896
TRACTOR HITCH

Filed May 23, 1958   2 Sheets-Sheet 1

INVENTOR.
CHARLES C. HENDRICKSON,
BY
McMorrow, Berman & Davidson
ATTORNEYS.

June 16, 1959 — C. C. HENDRICKSON — 2,890,896
TRACTOR HITCH
Filed May 23, 1958 — 2 Sheets-Sheet 2

INVENTOR.
CHARLES C. HENDRICKSON,
BY
McMorrow, Berman & Davidson
ATTORNEYS.

United States Patent Office 2,890,896
Patented June 16, 1959

2,890,896
TRACTOR HITCH
Charles C. Hendrickson, Turner, Mont.

Application May 23, 1958, Serial No. 737,294

4 Claims. (Cl. 280—467)

This invention relates to improvements in spring latched hitches, such as for farm tractors, of the driver controlled type, and more particularly to an improved hitch assembly of this kind which involves a swinging draw bar component and pin means for locking the swinging draw bar component in a selected position around a stationary draw bar component upon which the swinging draw bar component slidably rests.

The primary object of the invention is to provide a more practical, efficient, reliable, convenient, and more easily operated and controlled hitch assembly of this kind, which substantially reduces the expenditures of time and effort on the part of the tractor driver which are ordinarily required for adjusting and locking a swinging draw bar component.

Another object of the invention is to provide a hitch assembly of the character indicated which enables the driver of the tractor to produce positive and complete locking of the swinging draw bar component automatically in a selected position around the stationary draw bar component, and positive and complete unlocking thereof, and retention of the locking pin means in a fully withdrawn or unlocked condition, preparatory to a subsequent locking operation, from the ground, or from the driver's seat of the tractor, without attention from the driver other than operation of a manual cable having a handle located within easy reach of the driver's seat, so that the driver can concentrate upon driving of the tractor.

Another object of the invention is to provide a hitch assembly of the character indicated above wherein, when the pin is not engaged in a positioning hole in the stationary draw bar component and the locking pin means is released from withdrawn position, the pin is spring pressed into engagement with the stationary component and slides therearound, along with the swinging component, and is free to reach and to drop into a hole in the stationary component and lock the swinging component in a corresponding position around the stationary component, so that adjustment of the swinging component around the stationary component and locking thereof in a new position does not require dismounting of the driver for the purpose, but can be done by the driver from his seat on the tractor.

A further object of the invention is to provide a hitch assembly of the character indicated above which is adapted to control and steer a front swivel or caster wheel of a farm implement, such as a row-following wheel, so as to cause such wheel to follow accurately in a field row and at the same time have side-draft, the hitch assembly having on its swinging draw bar component a pivoted trailing section which is securable to the wheel for this purpose.

Other important objects and advantageous features of the invention will be apparent from the following description and the accompanying drawings, wherein, for purposes of illustration only, a specific form of the invention is set forth in detail.

Figure 1:
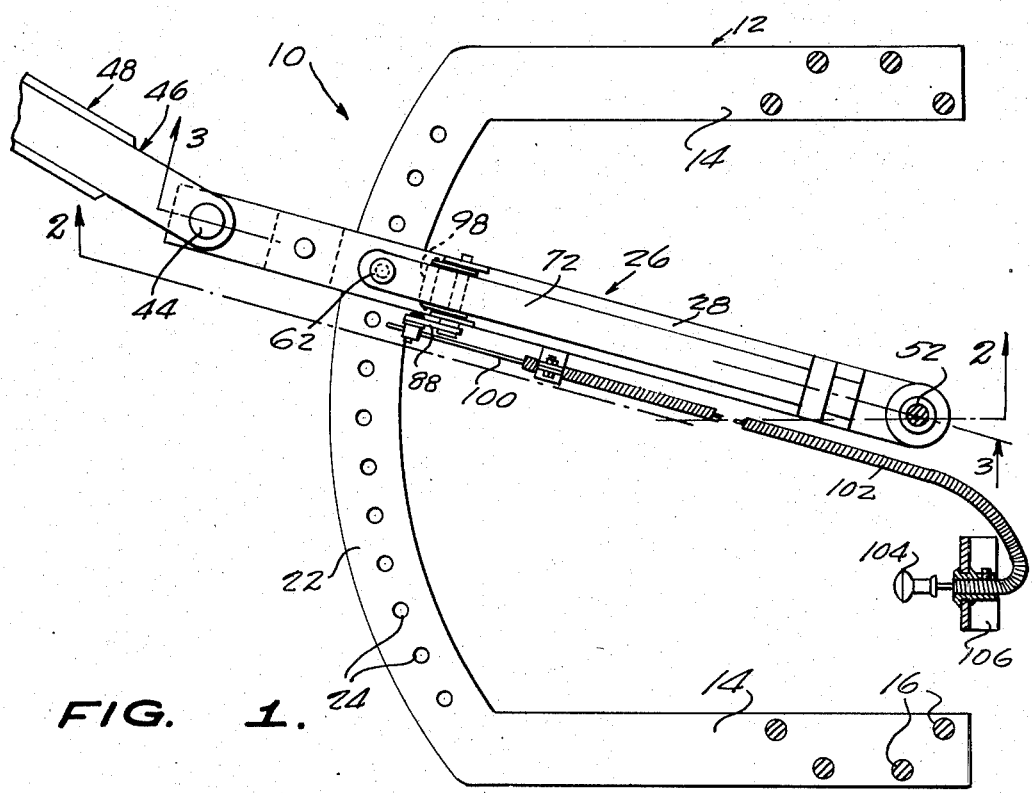
Figure 1 is a top plan view of a hitch assembly of the invention.

Referring in detail to the drawings, wherein like numerals designate like parts throughout the several views, the illustrated hitch assembly, generally designated 10, comprises a stationary horizontal U-shaped draw bar component 12 having legs 14 secured, as by bolts 16, to the rear axle housing 18 or other suitable part of a tractor 20, and an arcuate draw bar element 22 spaced rearwardly from the axle housing 18. At substantially equal intervals the bar element 22 is provided with pin receiving holes 24. The stationary draw bar component 12 can be conventional.

The hitch assembly 10 further comprises a swinging draw bar component, generally designated 26, which comprises spaced and overlying upper and lower horizontal bars 28 and 30, which are spaced from each other and fixed together by a block 32, secured as by bolts 34, which is located intermediate the ends of the bars 28 and 30 close to and forward of the arcuate draw bar element 22. Another spacer block 36 is disposed between the bars 28 and 30 at a point between the rear side of the draw bar element 22 and the rear ends of the bars 28 and 30, and is secured in place, as by a bolt 38. The rear ends of the bars 28 and 30 are traversed by vertically registered holes 40 and 42, which receive a pivot bolt 44 which pivotally connects to the rear end of the swinging hitch component 26, a draw bar 46 secured to the mounting (not shown) of a front swivel or caster wheel 48 of a farm implement and in line with such wheel, whereby the wheel 48 is caused to accurately follow a field row or furrow, and have side draft, in accordance with the pull exerted by a tractor equipped with the hitch assembly of the present invention.

Figure 2:
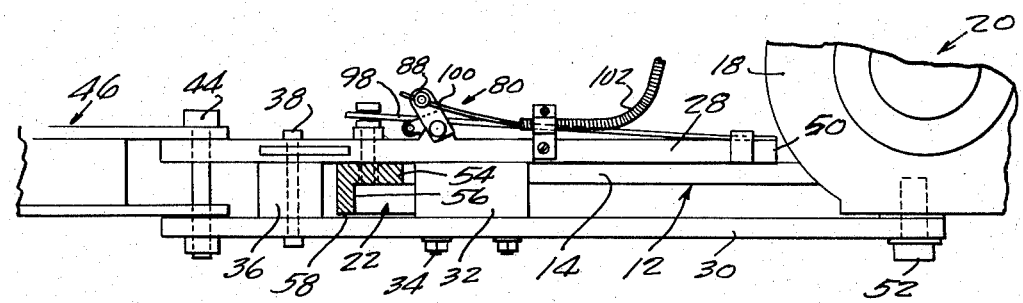
Figure 2 is an edge elevation thereof, taken from the line 2—2.

As shown in Figure 2, for example, the lower bar 30 of the swinging component 26, extends forwardly beyond the forward end 50 of the upper bar 28, and is traversed at its rear end by an anchoring and pivot stud 52, which is threaded upwardly into the housing 18 substantially at the center of curvature of the arcuate draw bar element 22, so that the component 26 is confined to swing concentrically around the element 22. The arcuate draw bar element 22 has a horizontal flange 54 upon which the upper bar 28 of the component 26 slidably bears, and a rear depending flange 56 having a lower edge 58 against which the lower bar 30 of the component 26 can slidably bear.

The upper bar 28 of the swinging draw bar component 26 has therein a single hole 60 which is arranged to register with any of the holes 24 in the draw bar element 22 as the component 26 is swung therearound. The hole 60 can be slightly smaller than the holes 24 and can be of the same size.

Working vertically and slidably through the hole 60 of the upper bar 28 is a vertically elongated round locking pin 62 having a rounded lower end 64. A tubular boss 66 rises around the hole 60 on the upper side of the bar 28 to serve as a guide for the pin 62. The pin 62 preferably has vertically spaced heads 68 and 70 on its upper end.

A relatively long and flat leaf spring 72 overlies the upper bar 28 forwardly of the pin 62 and has a forward end portion 74 which bears slidably upon the upper side of the bar 28 and is retained in place by a clip 76 secured to the bar 28, so that the spring 72 is free to move forwardly and rearwardly relative to the upper bar 28 to avoid canting of the pin 62 and binding thereof in the holes 60 and 24, as the pin 62 is engaged in and withdrawn from these holes. The spring 72 has a hole 78 in its rear end which loosely receives the upper part of the pin 62 between the heads 68 and 70, which are spaced from each other at a distance greater than the thickness of the spring 72, so as to provide for tilting of the pin 62 relative to the spring 72 necessary to maintenance by the pin 62 of a perpendicular position when being engaged in and withdrawn from the holes 60 and 24, to avoid binding and to provide for free and quick action of the pin 62.

For flexing the spring 72 upwardly and for freeing the spring 72 to flex downwardly in operating the pin 62 between depressed locking position and elevated withdrawn and retained positions, a cam assembly, generally designated 80 is provided, which comprises a block 82, suitably secured on the upper side of the upper bar 28 at a point close to and spaced forwardly from the pin 62 and has thereon a pair of laterally or transversely spaced upstanding ears 84 which journal a pin 86 extending therebetween. The pin 86 has fixed on one end thereof, a radial operating lever 88.

Figure 5:
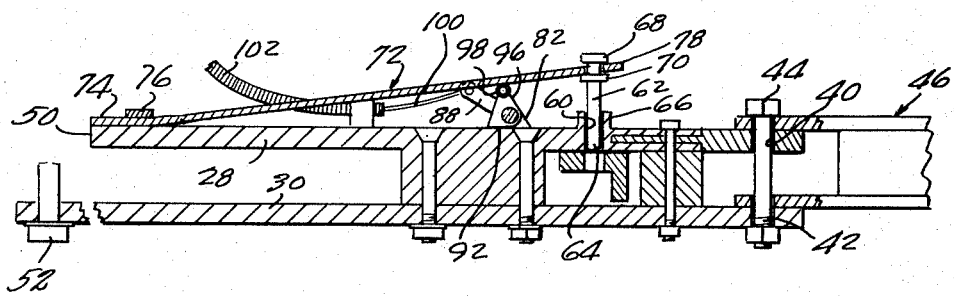
Figure 5 is an enlarged fragmentary and contracted vertical longitudinal section, like Figure 3, showing the pin in withdrawn and retained position.

A preferably triangular cam 90 is fixed eccentrically on the pin 86 and projects rearwardly from the pin 86. The cam 90 has on its lower end an abutment lower edge 92, which, as shown in Figure 5, is arranged to rest upon the upper surface of the upper bar 28, in an over-center position of the cam 90. The cam 90 has spaced side walls 94 which are tapered upwardly above the pin 86 to define a cam nose 96, which includes a roller 98 which is journaled on and extends between the side walls 94 and bears rollably against the underside of the spring 72.

Attached at one end of the cam operating lever 88 is a flexible Bowden wire 100, working frictionally through a flexible conduit 102, and having on its other end a handle 104. The conduit 102 may be fixed in a bracket mounted on the tractor in the region of the driver's seat (not shown) thereof, so as to place the handle 104 within convenient reach of the driver, for operating the cam assembly 80.

Figure 3:
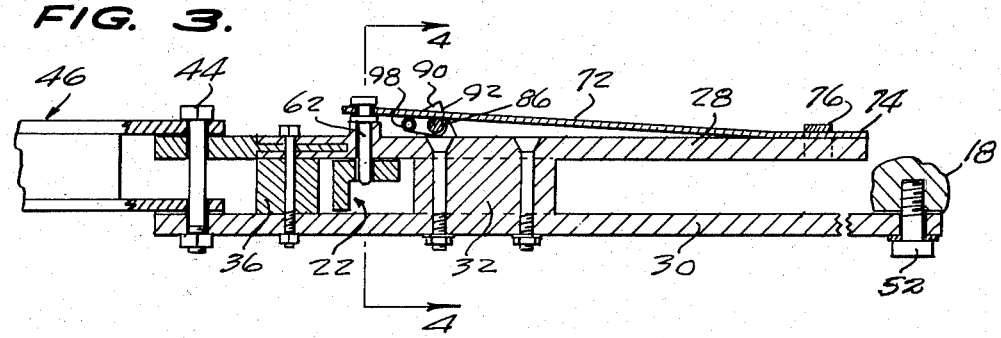
Figure 3 is a vertical longitudinal section, taken on the 3—3 of Figure 1, showing the pin in engaged position.
Figure 4:
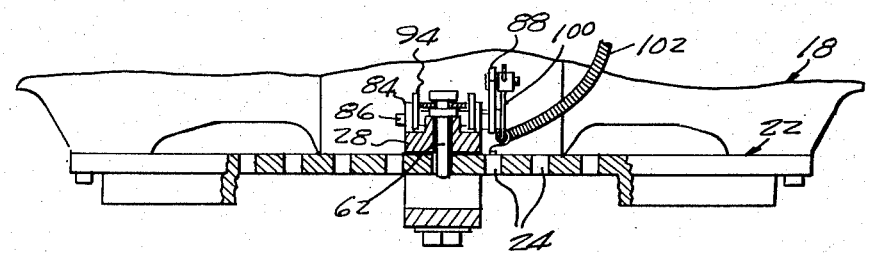
Figure 4 is an enlarged fragmentary vertical transverse section taken on the line 4—4 of Figure 3.

In the arrangement shown in Figures 2, 3 and 5 of the drawings, a pushed in position of the handle 104 positions the cam 90 in a rearward reclining position, in which the spring 72 has depressed the pin 62 into locking engagement in the hole 60 and in a selected draw bar element hole 24; a partially pulled out position of the handle 104 tilts the cam 90 upwardly and forwardly to a substantially erect intermediate position, in which the spring 72 is flexed upwardly and the pin is withdrawn from the draw bar element hole; and a fully pulled out position of the handle 104 tilts the cam 90 further forwardly to an over-center position, shown in Figure 5, in which its end 92 rests upon the upper bar 28 and the spring 72, and hence the locking pin 62, are retained in withdrawn positions, and are held thereon unless and until the handle 104 is pushed into the conduit 102 sufficiently to tile the cam into its intermediate position or into its reclining position. In this way, the pin 62 can be held in a withdrawn position with the swinging component 26 free to swing to either side along the stationary draw bar element 22, until it be desired to set the pin 62 to engage a hole 24 in the draw bar element 22.

By putting the cam in the described intermediate position, in which the cam is a rearward over-center position and is acted upon by the spring 72, and the pin 62 is out of a hole 24, the pin will lockingly engage in a next hole 24 in the draw bar element 22 whenever the swinging component 26 moves to a position presenting a hole 24. Thus, by watching the swing of the component 26 relative to the draw bar element 22, from his seat in the tractor, the driver can, by manipulating the handle 104, lock the swinging component in any desired position relative to the element 22, without leaving his seat.

Although there have been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A tractor hitch assembly comprising a tractor mounted stationary draw bar component having a transverse horizontal arcuate element provided with holes speced therearound, a swingable draw bar component comprising upper and lower bars having rear and forward ends, the forward end of the lower bar extending forwardly beyond the forward end of the upper bar, vertical pivot means on the forward end of the lower bar for pivoting the swinging component to a tractor, substantially at the center of curvature of said arcuate element, said arcuate element being positioned between said upper and lower bars with said upper bar slidably resting upon said arcuate element, said upper bar having a single hole registrable selectively with the holes of the arcuate element, a vertical locking pin working through said single hole for engaging in a hole of the arcuate element in a depressed position of the pin, spring means mounted on said upper bar and connected to the pin and urging said pin downwardly toward depressed position, cam means mounted on said upper bar and operatively engageable with said spring means for elevating the pin against the resistance of said spring means for withdrawing the pin upwardly out of a hole of the arcuate element, and control means operatively connected to said cam means, said cam means including means for retaining said cam means in pin withdrawn position and controlled by said control means and comprising a cam having an eccentric nose for engagement with said spring means in said second and intermediate positions, and said retaining means comprises an abutment end on said cam which is engageable with said upper bar in an overcenter disposition of the cam.

2. A tractor hitch assembly comprising a tractor mounted stationary draw bar component having a transverse horizontal arcuate element provided with holes spaced therearound, a swingable draw bar component comprising upper and lower bars having rear and forward ends, the forward end of the lower bar extending forwardly beyond the forward end of the upper bar, vertical pivot means on the forward end of the lower bar for pivoting the swinging component to a tractor, substantially at the center of curvature of said arcuate element, said arcuate element being positioned between said upper and lower bars with said upper bar slidably resting upon said arcuate element, said upper bar having a single hole registrable selectively with the holes of the arcuate element, a vertical locking pin working through said single hole for engaging in a hole of the arcuate element in a depressed position of the pin, spring means mounted on said upper bar and connected to the pin and urging said pin downwardly toward depressed position, cam means mounted on said upper bar and operatively engageable with said spring means for elevating the pin against the resistance of said spring means for withdrawing the pin upwardly out of a hole of the arcuate element, and control means operatively connected to said cam means, said cam means including means for retaining said cam means in pin withdrawn position and controlled by said control means and comprising a cam having an eccentric nose for engagement with said spring means in said second and intermediate positions, and said retaining means comprises an abutment end on said cam which is engageable with said upper bar in an overcenter disposition of the cam, said spring means comprising an elongated leaf spring having a first end slidably secured on said upper bar and a second free end, said free end being tensioned downwardly toward said upper bar and being loosely connected to the locking pin, the cam nose being engageable with the leaf spring at points between the ends of the leaf spring.

3. A tractor hitch assembly comprising a tractor mounted stationary draw bar component having a transverse horizontal arcuate element provided with holes spaced therearound, a swingable draw bar component comprising upper and lower bars having rear and forward ends, the forward end of the lower bar extending forwardly beyond the forward end of the upper bar, vertical pivot means on the forward end of the lower bar for pivoting the swinging component to a tractor, substantially at the center of curvature of said arcuate element, said arcuate element being positioned between said upper and lower bars with said upper bar slidably resting upon said arcuate element, said upper bar having a single hole registrable selectively with the holes of the arcuate element, a vertical locking pin working through said single hole for engagement in a hole of the arcuate element in a depressed position of the pin, spring means mounted on said upper bar and connected to the pin and urging said pin downwardly toward depressed position, cam means mounted on said upper bar and operatively engageable with said spring means for elevating the pin against the resistance of said spring means for withdrawing the pin upwardly out of a hole of the arcuate element, and control means operatively connected to said cam means, said cam means including means for retaining said cam means in pin withdrawn position and controlled by said control means and comprising a cam having an eccentric nose for engagement with said spring means in said second and intermediate positions, and said retaining means comprises an abutment end on said cam which is engageable with said upper bar in an overcenter disposition of the cam, said spring means comprising an elongated leaf spring having a first end slidably secured on said upper bar and a second free end, said free end being tensioned downwardly toward said upper bar and being loosely connected to the locking pin, the cam nose being engageable with the leaf spring at points between the ends of the leaf spring, a transverse pin mounted on said upper bar and carrying said cam, and a radial lever on said transverse pin and operatively connected to said control means.

4. A tractor hitch assembly comprising a tractor mounted stationary draw bar component having a transverse horizontal arcuate element provided with holes spaced therearound, a swingable draw bar component comprising upper and lower bars having rear and forward ends, the forward end of the lower bar extending forwardly beyond the forward end of the upper bar, vertical pivot means on the forward end of the lower bar for pivoting the swinging component to a tractor, substantially at the center of curvature of said arcuate element, said arcuate element being positioned between said upper and lower bars with said upper bar slidably resting upon said arcuate element, said upper bar having a single hole registrable selectively with the holes of the arcuate element, a vertical locking pin working through said single hole for engaging in a hole of the arcuate element in a depressed position of the pin, spring means mounted on said upper bar and connected to the pin and urging said pin downwardly toward depressed position, cam means mounted on said upper bar and operatively engageable with said spring means for elevating the pin against the resistance of said spring means for withdrawing the pin upwardly out of a hole of the arcuate element, and control means operatively connected to said cam means, said cam means including means for retaining said cam means in pin withdrawn position and controlled by said control means and comprising a cam having an eccentric nose for engagement with said spring means in said second and intermediate positions, and said retaining means comprises an abutment end on said cam which is engageable with said upper bar in an overcenter disposition of the cam, said spring means comprising an elongated leaf spring having a first end slidably secured on said upper bar and a second free end, said free end being tensioned downwardly toward said upper bar and being loosely connected to the locking pin, the cam nose being engageable with the leaf spring at points between the ends of the leaf spring, a transverse pin mounted on said upper bar and carrying said cam, and a radial lever on said transverse pin and operatively connected to said control means, said control means comprising a flexible wire having a first end secured to said lever and a second remote end having a handle thereon accessible from an associated tractor.

References Cited in the file of this patent

UNITED STATES PATENTS

| | | |
|---|---|---|
| 1,481,565 | Sellars et al. | Jan. 22, 1924 |
| 1,491,637 | Schrum | Apr. 22, 1924 |
| 2,687,900 | Thomas | Aug. 31, 1954 |
| 2,818,276 | Sprang | Dec. 31, 1957 |